Nov. 16, 1965     H. DERSCHMIDT     3,217,810
ROTARY WING AIRCRAFT CONTROL DEVICE
Filed June 28, 1963
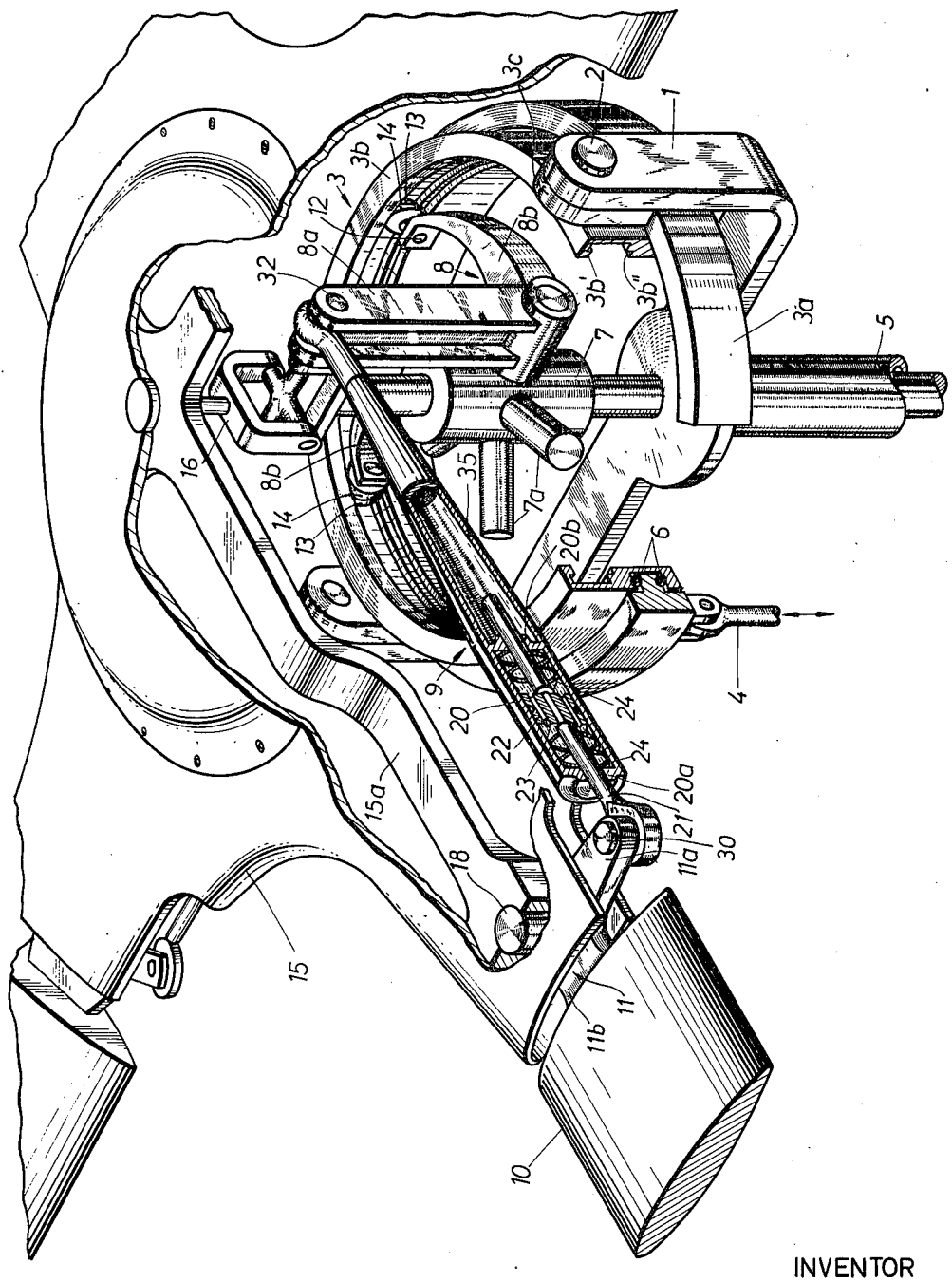
INVENTOR
Hans Derschmidt
By McGlew and Toren
ATTORNEYS United States Patent Office 3,217,810
Patented Nov. 16, 1965

3,217,810
ROTARY WING AIRCRAFT CONTROL DEVICE
Hans Derschmidt, Munich, Germany, assignor to Bolkow Gesellschaft mit beschrankter Haftung, Ottobrun, near Munich, Germany
Filed June 28, 1963, Ser. No. 291,446
Claims priority, application Germany, July 11, 1962, B 67,987
8 Claims. (Cl. 170—160.25)

This invention relates in general to control devices for operating the blades of rotary wing aircraft such as helicopters and in particular to a new and useful means for superimposing a force dampened lead-and-lag rotary movement upon the helicopter rotor blades which are mounted for rotation along with a central rotor head.

The present invention is an improvement over the construction disclosed in United States Patent 3,139,937 to Hans Derschmidt and Gerhard Eck, particularly in respect to the inclusion of damping means in the driving mechanism for moving the rotor blades through a pivotal lead-lag movement.

The present invention deals particularly with a rotary wing aircraft or helicopter of a type having a central rotatable rotor head with the rotor blades being pivotally mounted on the rotor head at a spaced location from the axis of rotation thereof, and being pivotal about an axis which is substantially parallel to the axis of rotation of the rotor head for the purpose of imparting a rotary lead-and-lag movement to the helicopter blades in addition to the rotary movements which they are given due to the rotation of the rotor head. A helicopter of this type may also advantageously include means for changing the pitch of the rotor blades by pivoting the blades about their longitudinal axes, but this forms no part of the present invention and has not been disclosed in detail.

In accordance with the present invention, there is provided a driving mechanism for pivoting the rotor blades about an axis substantially parallel to the axis of rotation of the rotor head to impart a decreased rotational speed as the blades are being advanced by the rotor head in a leading direction in respect to the direction of flight, and to also impart an increased rotational speed to the blades as they are being moved by the rotor head away from the direction of flight or in a trailing direction. The driving mechanism or transmission means includes crank members or double armed lever members for each blade which are pivotal about pins which are carried by the main rotor shaft and extend radially outwardly therefrom. One arm of each crank member is arranged to be guided upwardly and downwardly under the control of a swash plate and the opposite arm is arranged to transmit the up and down movement as rotary lead-lag movement to each of the rotor blades. In a preferred arrangement, the blades are mounted on one arm of crank arms which are pivotal about an axis substantially parallel to the rotor axis and have their other arms connected through the medium of a connecting rod member to the oscillatable crank member.

One of the disadvantages in the operation of mechanism of this nature is that the connecting rod members and all of the associated transmission parts are subject to shock forces in the event that the rotor blades encounter unusual stresses or unbalancing forces during their operation.

In accordance with the present invention, therefore, the connecting means between the rotor blades and the means for transmitting a controlled rotary movement thereto include damping means which is adapted to yield in the event that any unbalancing forces are produced between the helicopter rotor blades and the transmission mechanism. In the preferred arrangement, the connecting rod is constructed in the form of a hydraulic damper which includes a piston element which may be displaced upon displacement of a fluid on each side thereof through a small diameter bore of the piston element.

Accordingly, it is an object of the present invention to provide improved means for imparting a rotary lead-lag movement to a rotary wing aircraft helicopter blade.

A further object of the invention is to provide a control mechanism for pivoting a rotor blade of a rotary wing aircraft for effecting lead-and-lag movements as the blade is rotated with a rotatable rotor head, which includes damping means between the transmission and the rotor blade.

A further object of the invention is to provide a control device for the pivotal lead-lag movement of a rotor blade which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention.

The single figure of the drawing is a somewhat schematic perspective view, partially in section, of a helicopter rotor blade lead-lag movement control mechanism constructed in accordance with the invention.

Referring to the drawing in particular, the invention embodied therein includes a rigid frame 1 which is arranged transverse to the longitudinal axis of the aircraft (not shown). A swash plate assembly generally designated 3 includes a lower ring portion 3a and an upper ring portion 3b which is rotatable on the lower portion. The lower portion 3a includes upstanding arms 3c which support the lower portion 3a for pivotal movement on a pin 2 which is supported at the upper end of the frame 1 for the purpose of adjusting the tilt of the swash plate. A rotor shaft 5 extends upwardly through a suitable opening in the frame 1 and the swash plate 3a may be tilted relative to the rotor shaft 5 by movement of a control rod 4 which is connected through the lower portion 3a. The control rod 4 may be manipulated by the pilot.

The swash plate parts 3a and 3b are concentrically mounted relative to each other, and the part 3a is tiltable by means of the control rod 4 but is not rotatable. The part 3b is rotatably mounted on the part 3a by means of two anti-friction rings 6 and the C-shaped sectional portion of the lower part thereof engages around a projecting portion of the part 3a and prevents the parts from being displaced out of interengagement.

A collar 7 is secured to the shaft 5 for rotation therewith and includes a plurality of radially extending pins 7a which are equally angularly spaced and of a number corresponding to the number of blades which are employed in the aircraft. As indicated, the pins extend perpendicular to the rotor shaft 5 and each pin mounts a double armed lever or crank member generally designated 8.

In the drawing, only crank member 8 is shown in order not to crowd the drawing and to permit clear illustration of the operating parts. It should be appreciated, however, that a separate crank member 8 is provided for each pin 7a and each of the rotor blades which are employed on the aircraft.

One arm 8b of the double armed lever 8 carries a pin 12 on which are rotatable two guide rollers 13 and 14. The roller 13 bears on the lower guide surface 3b″ and the roller 14 bears on the upper guide surface 3b′. Generally speaking, the rollers 13 and 14 are not displaced along the guide surfaces 3b' and 3b'', but the upper portion of the swash plate 3b rotates along with the rollers and the rotor shaft 5. An oscillatable up and down movement is imparted to the arm 8b only when the swash plate 3a is moved out of a plane which is perpendicular to the axis of the rotor shaft 5. This up and down movement is transmitted as an oscillating movement to the arm 8a which is pivotally connected at its upper end to connecting rod means or a connecting rod assembly generally designated 9. The other end of the connecting rod assembly 9 is pivotally connected to a pin 30 which is carried on an end of an arm 11a of a crank arm member generally designated 11. The crank arm member 11 is pivoted on a pin 18 having an axis which is substantially vertical and parallel to the axis of the main rotor shaft 5 and an opposite arm 11b is rigidly connected to a rotor blade 10. The pin 18 is rotatably carried on an arm 15a of the rotor head 15. Pivotal movement of the crank member 11 about the pin 18 causes a pivotal lead-and-lag movement of the rotor blade 10 which will be superimposed upon its rotational movement caused as it moves along with the rotor head, which is indicated in dotted lines at 15.

In accordance with the invention, the connecting rod means 9 is constructed as a hydraulic damper and it includes a cylinder portion 20 which is pivotally connected to arm 8a at pin 32 by an extending portion 35. A piston rod member 21 is pivotal at the end of arm 11a on pin 30 and it is guided in the cylinder 20 in guides 20a and 20b at each end of a cylindrical portion thereof. The rod 21 has a piston portion 22 which is normally centrally disposed within the cylindrical portion 20. The interior of the cylinder portion is filled with a liquid on each side of the piston 22 and the guides 20a and 20b are sealed to prevent the escape of the liquid from the cylinder.

In accordance with the invention, any tangential forces acting on the rotor blades 10 which would tend to be transmitted to the operating mechanism will be dampened by the movement of the piston 22 which may occur by the displacement of the liquid through a small diameter bore 23 which is formed in the piston. In order to prevent an over-travel of the piston 22, plate-like springs 24 are arranged at each end of the cylinder 20 and they act as elastic abutments. Such springs come into action if the damping path of the piston 22 is exceeded. Such a damping path is adjusted for the normal load conditions which will occur. The springs prevent damage of the rotor by hard impact of the piston against the cylinder ends.

The rotor head 15 is articulated by means of a cardan joint 16 at the upper end of the rotor shaft 5 which is connected to the rotor head so that the rotor head 15 rotates along with the shaft 5. The cardan joint 16 permits pivotal movement or tilting of the rotor head in respect to the axis of the shaft 5.

The device operates as follows: If a periodic lead-lag movement is forced upon the rotor blades by the swash plate 3 which is adjusted to an inclined position and which acts through the double armed lever 8 and the connecting rod means 9 and the angular level 11, then the rotor blades 10 will follow this movement for a period until all successive resistances occur in the blades. Since the forced movements of the blades 10 are arranged to occur such that they correspond substantially to the free lead-lag tilting movement of the blade in the manner of a centrifugal pendulum, the forces for forcing upon this tilting movement are so small that the damping piston will not move from its center position in the figure, but the connecting rod assembly 9 will move substantially as a one-piece connecting rod, acting as a rigid connection between the lever 8 and the crank arm 11.

When, however, particularly large tangential forces act on the rotor blades 10 which, for example, can take place with a sudden wind gust or sudden decline and thereafter sudden stop of the helicopter, then the damping means will yield relative to these forces so that the blades can perform a somewhat compensated pivotal movement. To permit this, the damping piston 22 is displaceable in the cylinder 20 to cause an exchange of the hydraulic liquid in the cylinder spaces through the bore 23. In periodic lead-lag movement, the center point of the oscillation will, for example, be displaced by some degree.

While a specific embodiment of the invention has been shown and described in detail to illustrate the application of the inventive principles, it will be understood that this invention may be embodied otherwise without departing from such principles.

The embodiments of the invention in which an exclusive property or privilege is claimed are defined as follows:

1. In a control mechanism for superimposing a lead-lag movement upon a blade of a rotary wing aircraft, comprising a rotatable head, a blade mounted on said head for rotative movement therewith and for pivotal lead-lag movement about an axis substantially parallel to the axis of rotation of said head, a double armed lever member rotatable with said head and pivotable about an axis substantially perpendicular to said head, and a swash plate including a freely rotatable part engaged with one arm of the lever member and a part tiltably mounted on said rotatable head, said rotatable part providing means for oscillating the double armed lever member in accordance with the tilt of the tiltable part of said swash plate, the improvement comprising connecting rod means connecting the other arm of said double armed lever to said rotor blade for positively driving said rotor blade about its lead-lag axis as said double armed lever is oscillated, including a member hydraulically displaceable for damping the forces transmitted between said double armed lever and said blade during the driving of said blade about a lead-lag axis.

2. In a conrtol mechanism according to claim 1, wherein said connecting rod means includes a member pivoted to said double armed lever at its one end and having a cylinder at its opposite end, and a connecting rod member slidable in said cylinder, said connecting rod member having a piston portion with a small diameter bore, said cylinder having liquid therein which will be displaced through said bore upon the transmission of abnormal forces between said rotor blade and said double armed lever.

3. In a helicopter including a rotary central head rotatable about a first axis, a rotor blade mounted on said head for rotatable lead-lag movement about a second axis substantially parallel to said first axis, a rotatable rotor shaft, means connecting said rotor head to said shaft for rotation therewith, and a double armed lever member carried by said shaft, oscillatable about an axis substantially perpendicular to said shaft and connected to said rotor blade to produce pivotal lead-and-lag movements of said blade, and swash plate means operatively engaged with one arm of said double armed lever for oscillating said double armed lever in accordance with the angular disposition of said swash plate means, the improvement comprising hydraulic damping means connected between said double armed lever and said rotor blade.

4. In a helicopter according to claim 3, wherein said damping means includes a connecting rod assembly, said connecting rod assembly including a first element connected at one end to one arm of said double armed lever and having a cylinder portion, and a second portion connected to said rotor blade having a piston portion slidable in said cylinder portion, said cylinder portion being in fluid tight sealing engagement with said second portion at each end thereof, said piston portion having a bore defined therethrough permitting liquid in the cylinder portion to move from one said of said piston to the other through the bore in order to permit displacement of said rod portion and said cylinder portion during the transmission of unusual forces between said double armed lever and said rotor blade.

5. In a device according to claim 4, including spring members on each side of said cylinder for forming resilient abutments for said piston portion at each end.

6. A control mechanism for superimposing a lead-and-lag pivotal movement upon a blade of a rotary wing aircraft, comprising a rotatable head, a crank arm member pivotally mounted in said head for pivotal movement about a substantially vertical axis, a rotor blade connected to one arm of said crank arm member, a main rotor shaft, means connecting said main rotor shaft to said head for rotation of said head with said shaft, a pin extending radially outwardly from said shaft and being rotatable therewith, a two armed lever oscillatably mounted on said pin, a swash plate pivotally mounted around said rotor shaft, said two armed lever having a first arm portion operatively engaged with said swash plate and being movable up and down in accordance with pivotal movement of said swash plate and a second arm portion, means pivotally mounting said swash plate around said shaft, and connecting rod means connected between said second arm portion of said two armed lever and the opposite arm of said crank arm, said connecting rod means including means for damping the forces transmitted between said two armed lever and said crank arm, said means being operated in hydraulic manner.

7. A control mechanism according to claim 6, wherein said connecting rod means includes a first member pivotally connected to said second arm portion of said double armed lever and having a cylinder formed at one end thereof, a second member pivotally connected to one arm of said crank arm and having a rod portion guided through each end of said cylinder and a piston portion slidable within said cylinder, said piston portion having a bore for permitting displacement of liquid on each side thereof in said cylinder during the transmission of abnormally high forces acting between said rotor blade and said double armed lever.

8. A control mechanism according to claim 7, including spring elements at each end of said cylinder acting as resilient abutments for said cylinder.

References Cited by the Examiner
UNITED STATES PATENTS

| | | | |
|---|---|---|---|
| 2,512,461 | 6/1950 | Jenny | 170—160.25 |
| 2,519,762 | 8/1950 | Hoffman | 170—160.25 |
| 2,704,128 | 3/1955 | Papadakos | 170—160.27 |
| 3,139,937 | 7/1964 | Derschmidt et al. | 170—160.25 |

FOREIGN PATENTS

| | | |
|---|---|---|
| 726,828 | 3/1932 | France. |
| 1,129,060 | 5/1962 | Germany. |

JULIUS E. WEST, *Primary Examiner.*